United States Patent
Narayanan et al.

(10) Patent No.: US 7,173,917 B1
(45) Date of Patent: Feb. 6, 2007

(54) UNICAST AGENT ADVERTISEMENT BASED ON LAYER 2 AND LAYER 3 MOTION DETECTION

(75) Inventors: Raja P. Narayanan, Irving, TX (US); Mohamed Khalil, Dallas, TX (US); Haseeb Akhtar, Garland, TX (US); Emad A. Qaddoura, Plano, TX (US)

(73) Assignee: Nortel Networks Limited, St. Laurent (CA)

( * ) Notice: Subject to any disclaimer, the term of this patent is extended or adjusted under 35 U.S.C. 154(b) by 0 days.

(21) Appl. No.: 09/540,362

(22) Filed: Mar. 31, 2000

(51) Int. Cl.
*H04Q 7/00* (2006.01)
*H04Q 7/20* (2006.01)
*H04B 7/216* (2006.01)
*H04L 12/66* (2006.01)
*H04J 3/16* (2006.01)

(52) U.S. Cl. .............. 370/331; 370/335; 370/342; 370/356; 370/466; 455/435.1

(58) Field of Classification Search ........ 370/335–342, 370/351, 352–356, 389, 392, 400, 401, 328, 370/331, 466; 455/403, 432, 435.1; 709/218–219, 709/229, 317, 225; 713/153, 155, 160, 168
See application file for complete search history.

(56) References Cited

U.S. PATENT DOCUMENTS

| | | | |
|---|---|---|---|
| 5,793,762 A | 8/1998 | Penners et al. | |
| 5,883,890 A | 3/1999 | Okanoue | |
| 5,905,719 A | 5/1999 | Arnold et al. | |
| 6,137,791 A * | 10/2000 | Frid et al. | 370/352 |
| 6,230,012 B1 * | 5/2001 | Willkie et al. | 455/435.1 |
| 6,452,920 B1 * | 9/2002 | Comstock | 370/349 |
| 6,496,505 B2 * | 12/2002 | La Porta et al. | 370/392 |
| 6,501,746 B1 * | 12/2002 | Leung | 370/338 |
| 6,535,493 B1 * | 3/2003 | Lee et al. | 370/329 |
| 6,567,664 B1 * | 5/2003 | Bergenwall et al. | 455/403 |
| 6,577,643 B1 * | 6/2003 | Rai et al. | 370/466 |

(Continued)

OTHER PUBLICATIONS

La Porta, Thomas F.; Salgarelli, Luca; Foster, Gerald T.; "Mobile IP and Wide Area Wireless Data;" 1998, IEEE.

(Continued)

*Primary Examiner*—Chi Pham
*Assistant Examiner*—Melanie Jagannathan
(74) *Attorney, Agent, or Firm*—Hemingway & Hansen, LLP; D. Scott Hemingway; Malcolm W. Pipes

(57) ABSTRACT

An improved wireless mobile IP system including an apparatus and method for managing transmission of information. Agent advertisements are used to detect movement of the mobile node and derive care-of addressing information for the Home Agent. Foreign Agents and Home Agents currently periodically broadcast an agent advertisement on the data channel. The claimed system reduces the need for agent advertisements by detecting movement of a mobile user into a new network using either the mobile node or a routine on a low-level protocol layer. After detection of movement, an agent solicitation message is transmitted from the mobile node or from the cell-site transmitter. The mobility agent then transmits a single agent advertisement in response. Derived care-of addressing information will then be registered with the Home Agent to support "tunneling" of communications to the mobile node through the foreign network. Transmission of agent advertisements and associated non-data traffic on the data channels will be reduced.

54 Claims, 3 Drawing Sheets

U.S. PATENT DOCUMENTS 6,621,810 B1 * 9/2003 Leung ......................... 370/338
6,636,498 B1 * 10/2003 Leung ......................... 370/338
6,665,537 B1 * 12/2003 Lioy .......................... 455/435.1
6,665,718 B1 * 12/2003 Chuah et al. ................ 709/225
6,711,147 B1 * 3/2004 Barnes et al. ................ 370/338
6,738,362 B1 * 5/2004 Xu et al. ..................... 370/329

OTHER PUBLICATIONS

Perkins, Charles E.; "Tutorial: Mobile Networking Through Mobile IP;" Jan. 1998; IEEE Internet Computing.

Perkins, C.; "RFC 2002: IP MObility Support;" Oct. 1996, Network Working Group.

* cited by examiner

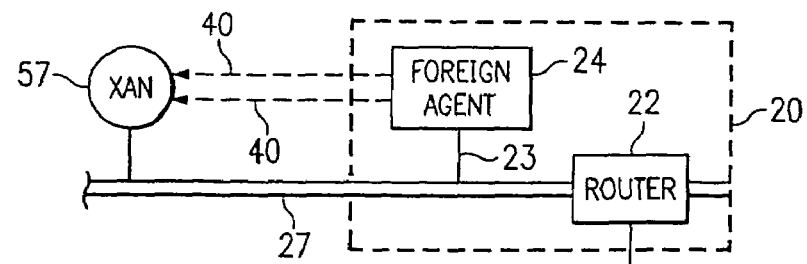
FIG. 1
(PRIOR ART)
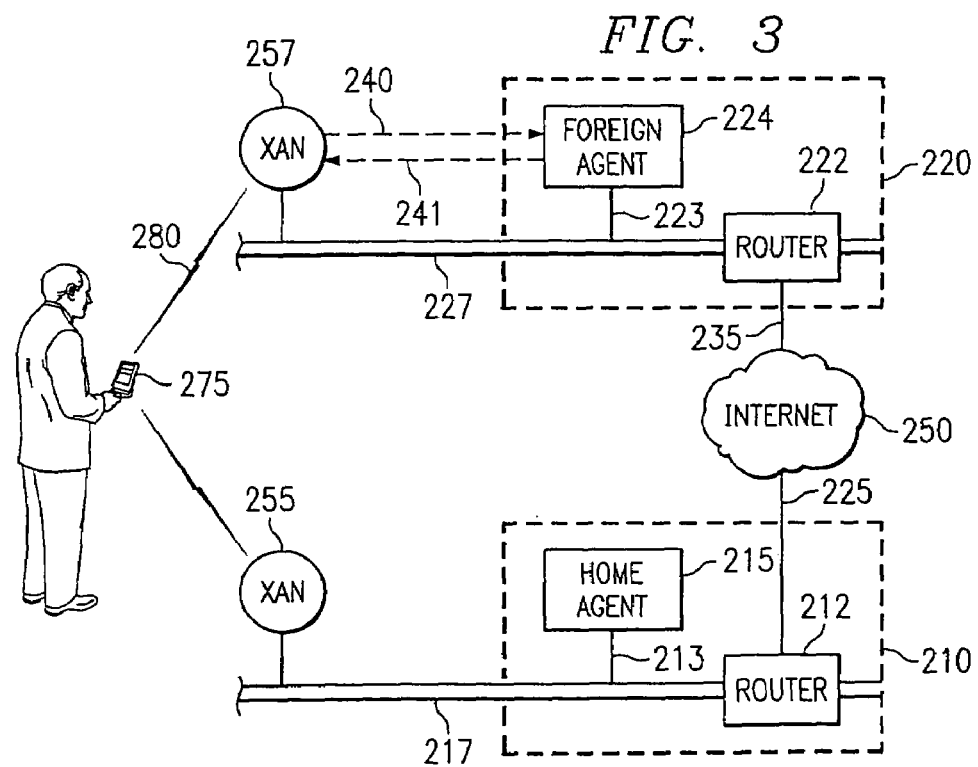

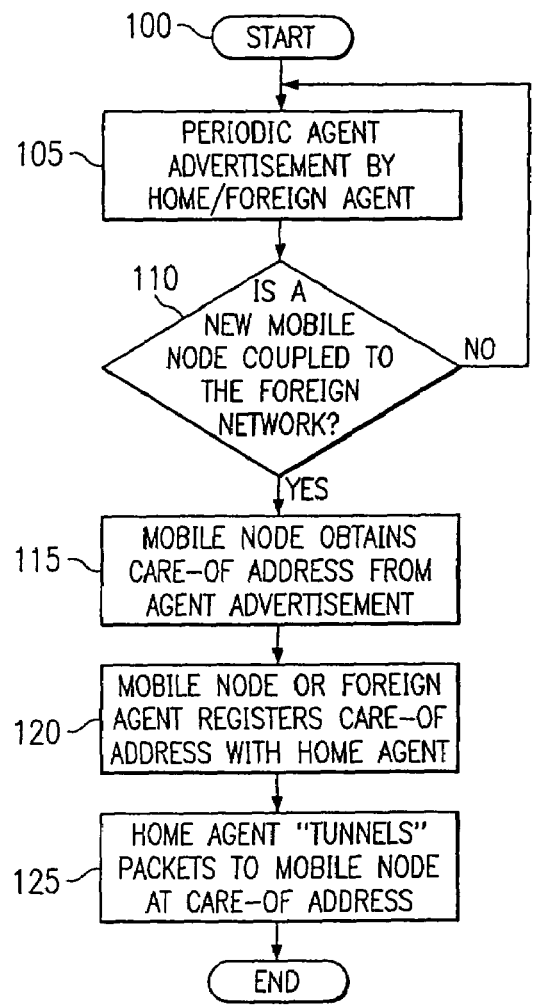
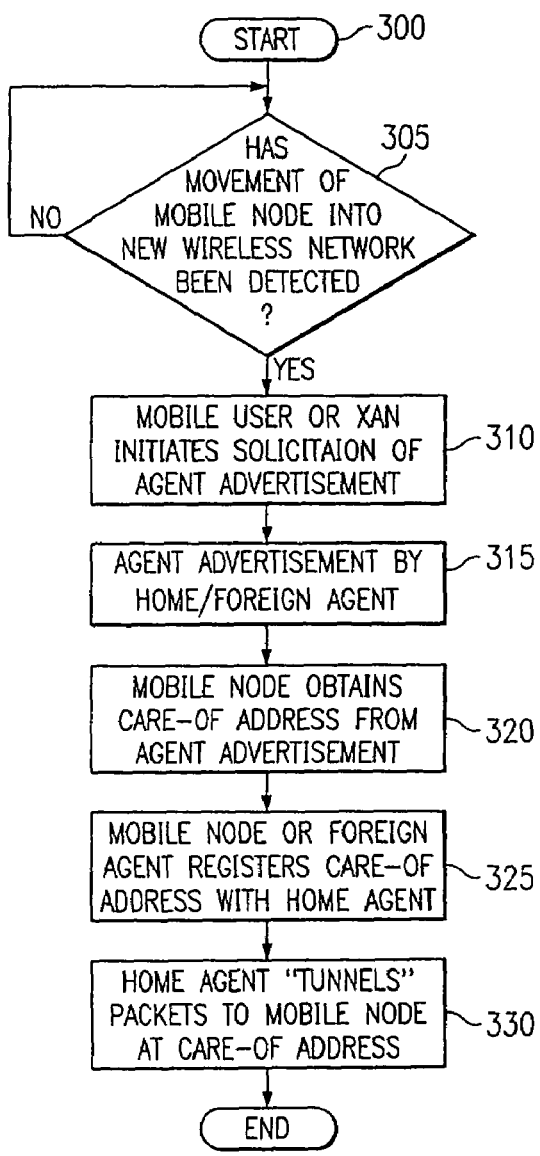

UNICAST AGENT ADVERTISEMENT BASED ON LAYER 2 AND LAYER 3 MOTION DETECTION

TECHNICAL FIELD OF THE INVENTION

This invention relates to an improved Internet Protocol (IP) based mobile communications system having mobility agents (such as a Home Agent and a Foreign Agent) and a mobile node, and the improved method for operating said system.

BACKGROUND OF THE INVENTION

Present-day Internet communications represent the synthesis of technical developments begun in the 1960s—the development of a system to support communications between different United States military computer networks, and the subsequent development of a system to support the communication between research computer networks at United States universities. These technological developments would subsequently revolutionize the world of computing.

The Internet, like so many other high tech developments, grew from research originally performed by the United States Department of Defense. In the 1960s, Defense Department officials began to notice that the military was accumulating a large collection of computers—some of which were connected to large open computer networks and others that were connected to smaller closed computer networks. A network is a collection of computers or computer-like devices communicating across a common transmission medium. Computers on the Defense Department's open computer networks, however, could not communicate with the other military computers on the closed systems.

Defense Department officials requested that a system be built to permit communication between these different computer networks. The Defense Department recognized, however, that a single centralized system would be vulnerable to missile attacks or sabotage. Accordingly, the Defense Department mandated that the system to be used for communication between these military computer networks be decentralized and that no critical services be concentrated in a few, vulnerable failure points. In order to achieve these goals, the Defense Department established a decentralized standard protocol for communication between network computers.

A few years later, the National Science Foundation wanted to connect network computers at various research institutions across the country. The NSF adopted the Defense Department's protocol for communication, and this combination of research computer networks would eventually evolve into the Internet.

Internet Protocols

The Defense Department's communication protocol governing data transmission between computers on different networks was called the Internet Protocol (IP) standard. The IP standard now supports communications between computers and networks on the Internet. The IP standard identifies the types of services to be provided to users, and specifies the mechanisms needed to support these services. The IP standard also describes the upper and lower system interfaces, defines the services to be provided on these interfaces, and outlines the execution environment for services needed in the system.

A transmission protocol, called the Transmission Control Protocol (TCP), was also developed to provide connection-oriented, end-to-end data transmission between packet-switched computer networks. The combination of TCP with IP (TCP/IP) forms a system or suite of protocols for data transfer and communication between computers on the Internet. The TCP/IP standard has become mandatory for use in all packet switching networks that connect or have the potential for utilizing connectivity across network or sub-network boundaries.

The TCP/IP Protocol

In a typical communications scenario, data is transmitted from an applications program in a first computer, through the first computer's network hardware, and across the transmission medium to the intended destination on the Internet. After receipt at a destination computer network, the data is transmitted through the destination network to a second computer. The second computer then interprets the communication using the identical protocols on a similar application program. Because of the standard protocols used in Internet communications, the TCP/IP protocol on the second computer should decode the transmitted information into the original data transmitted by the first computer.

To fully support Internet communications, the TCP/IP protocol system must perform the following tasks: (1) dividing messages into manageable chunks of data to pass efficiently through the transmission medium, (2) interfacing the network adapter hardware, (3) addressing target data to a specified computer and allowing the computer to acknowledge receipt of the data or recognize the absence of a message it was supposed to have received, and (4) routing data to a destination computer even if the source and destination computers are on different physical networks. The TCP/IP network protocol must also error check and control data flow, and TCP/IP protocol supports many important features such as logical addressing, high-level naming service, and application program support.

The TCP/IP Protocol Layers

One of the rules in TCP/IP communications is that a computer user does not need to get involved with details of data communication. In order to accomplish this goal, the TCP/IP standard imposes a layered communications system structure. All the layers are located on each computer in the network, and each module or layer is a separate component that theoretically functions independent of the other layers.

TCP/IP and its related protocols form a standardized system for defining how data should be processed, transmitted and received on the Internet. TCP/IP defines the network communication process, and more importantly, defines how a unit of data should look and what information the message should contain so that the receiving computer can interpret the message correctly. Because the standardized layer design of TCP/IP, a consistent conversion of base data is ensured regardless of the version or vendor of the TCP/IP conversion software.

The TCP/IP protocol suite is the interface between the application programs on the computer and the data communication hardware. Each layer is responsible for a separate task or routine in the network communication. The Protocol Layers for the Basic Networking Scheme (TCP/UDP and IP) and the OSI Protocol Layers are identified in Table I.

TABLE I

| Protocol Layer | Protocol Layers for Basic Networking Scheme | Protocol Layer (OSI) |
|---|---|---|
| 7 | Network | Application |
| 6 | Applications | Presentation |
| 5 |  | Session |
| 4 | TCP/UDP | Transport |
| 3 | IP | Network |
| 2 | Data Link | Data Link |
| 1 | Physical | Physical |

When a first computer transmits a data message to a second computer on the Internet—either sending a message or requesting information—the TCP/IP Protocol Layers in the first computer prepare the base data for transmission to a second computer by adding additional information to the base data. New pieces of information (e.g. headers) are added to the base data as the base data descends through each layer in the protocol. After processing, the base data with various headers will form a fully structured datagram under the TCP/IP protocol.

After the base data has been processed by all the layers in the protocol, it is ready for transmission across the Internet to the second computer. The datagram is transmitted on the Internet and should be received by the intended destination computer. For the second computer to interpret the incoming data, the same set of TCP/IP protocol layers are used by the second computer—only in reverse order. As the transmitted information ascends through the protocol layers in the second computer, each protocol level strips away the added information (e.g. headers) to leave the base data in the applications program of the second computer.

In the OSI model, the Application Layer (level 7) supports the transfer of information that is specific to the computer program being run by a user. Some application-layer protocols define how electronic mail is to be exchanged, while other Application Layer protocols define how files are to be transferred from one computer to another or how World Wide Web pages are to be fetched by a server from a browser page.

The Presentation Layer (level 6) in the OSI model defines the syntax and semantics of the information being exchanged by an applications program. This means that the presentation-layer protocol defines how the integers, text messages, and other data of an application program are to be encoded and transmitted over the network. This layer supports computers using different types of hardware and operating systems thereby allowing all computers to exchange information with lower protocol layers regardless of their particular method of storing or processing data.

The Session Layer (level 5) delivers a stream of data to the Transport Layer based upon the application-oriented tasks being performed in the higher level layers. Some Session Layer protocols provide periodic checkpoints allowing resumption of a communication in the event of a catastrophic network failure. In real world environments, the Application, Presentation, and Session Layers (Levels 5, 6 and 7) may be viewed as a single layer called the Application Layer.

The Transport Layer (level 4) is responsible for preparing the data for packet transmission on the Network Layer. The Transport Layer protocol defines the methods for detecting errors in a transmission of segments and for correcting these errors. The Transport Layer often uses the TCP protocol because it has a high degree of reliability and error checking capabilities. The Transport Layer could also use the UDP protocol, which is a simple interface to the Network Layer. While quicker than the TCP protocol, the UDP does not necessarily provide for increased reliability in data transmission.

In the OSI model, the Network Layer provides the interface between the physical network defined by Layers 1 and 2 (the Data Link Layer and the Physical Layer) and the higher level protocol levels defined by Layers 4–7 (the Transport, Session, Presentation and Application Layers). The Network Layer uses the frame transmission facility provided by the Data Link Layer to move data packets from their original source to their ultimate destination on the Internet.

The Network Layer supports the key TCP/IP protocols for logical addressing and routing of data. According to the IP protocol, the Network Layer formats data and addresses the data for transmission to the destination network or sub-network based on physical hardware addresses. The Network Layer protocol also defines how network devices discover the existence of other network devices and computers, and how packets find their final destination. The Network Layer also provides error checking for data delivered on the physical network.

The Data Link Layer (Level 2) provides an interface with the network adapter and maintains logical links for the network. The Data Link Layer also uses the raw bit transmission facility provided by the Physical Layer to move frames of data from one computer to neighboring computers on the same network or sub-network. The Data Link Layer protocol defines methods for ensuring the reliability of each data frame and also arbitrates access to those media types that are shared by many computers.

The Physical Layer (Level 1) moves raw data bits across a communication medium. A Physical Layer defines the electrical and mechanical characteristics of the communication media, the bit rate, the voltages, and any other parameter necessary for communication of raw data bits on the communication system. The Physical Layer converts the data stream comprising electric or analog signals and oversees the transmission of data thereon.

Tasks performed in protocol layers 2 and 3 play an important role in interfacing the high-level application program levels with the physical communications network levels. By design, the tasks performed on these lower level protocols are automated because they operate on low-level data structures and these low-level tasks control the physical hardware on the communications system. These lower level layers operate virtually by themselves with no direct user interaction or control—primarily so as to not trouble the computer user with the details of data bit transfer or routing path determinations.

TCP/IP Addressing and Routing

A computer operating on a network is assigned a unique physical address. On a Local Area Network ("LAN"), the physical address of the computer is a number given to computer's network adapter card. Hardware LAN protocols use this physical address to deliver packets of data to computers on the LAN.

On the Internet, the TCP/IP protocol routes data packets using logical addressing. Logical addresses are generated by the network software in the Network Layer. Specifically, a logical address in the TCP/IP network is translated into a corresponding physical address using the ARP (Address Resolution Protocol) and RARP (Reverse Address Resolution Protocol) protocols in the Network Layer.

The TCP/IP's logical address is also called an IP address. The IP address can include: (1) a network ID number identifying a network, (2) a sub-network ID number identifying a sub-network on the network, and, (3) a host ID number identifying a particular computer on the sub-network. The IP addressing scheme imposes a sensible addressing scheme that reflects the internal organization of the network or sub-network.

A computer network is often subdivided into smaller sub-networks. The computer network is divided in this manner to increase data transmission efficiency and reduce overall network traffic. Routers are used to regulate the flow of data into and out of designated sub-networks of the computer network.

A router interprets the logical address information of a data packet, such as an IP address, and directs the data packet across the network to its intended destination. Data addressed between computers on the sub-network does not pass through the router to the greater network, and therefore does not clutter the transmission lines of the greater network. If data is addressed to a computer outside the sub-network, however, the router forwards the data onto the larger network.

The TCP/IP network includes protocols that define how routers will determine the path for data through the network. Routing decisions are based upon information in the IP packet header and entries in each router's routing table. A routing table possesses sufficient information for a router to make a determination on whether to accept the communicated information on behalf of a destination computer, or pass the information onto another router in the network. The routing table also permits the router to determine where the information should be forwarded within the network or sub-network.

The routing table can be configured manually with routing table entries or a dynamic routing protocol that can accommodate changing network topologies—network architecture or network layouts, routers, and interconnections between hosts and routers. In a dynamic routing protocol, a router advertises reachability when it sends updated routing information to a second router claiming that the first router is capable of reaching one or more destination addresses. Advertising accessibility is important to the process of receiving, directing and re-directing data packets on the Internet.

SUMMARY OF THE INVENTION

Internet protocols were originally developed with an assumption that Internet users, which are assigned a unique IP address, would be connected to a single, fixed network—that is, one physical fixed location. With the advent of portable and handheld computers, however, the movement of Internet users within a network and across network boundaries has become quite common. Because of this highly mobile Internet usage, the implicit design assumptions for the Internet protocols have been violated.

The present invention relates to an improved IP-based mobile system including an apparatus and methods for managing bidirectional transmission of information with at least one mobile node in a wireless communication system. The term "node" includes a mobile communication unit. An IP-based mobile system manages mobile communication by managing the mobile node "care-of" address assignments and routing all packages destined for mobile units to their current location on the Internet. While the system can operate under the Mobile IP protocol (RFC 2002), the invention is not limited to this protocol and can be used with any IP-based mobile system having mobility agents.

Mobility agents can include Home Agents and Foreign Agents defined in the Mobile IP protocol (RFC 2002), but a mobility agent is not necessarily restricted to a single protocol. In fact, the term Home Agent, as used in this application, can refer to a Home Mobility Manager, Home Location Register, Home Serving Entity, or any other agent at a home network having the responsibility to manage mobility-related functionality for a mobile node on a home network. Likewise, the term Foreign Agent, as used in this application, can refer to a Serving Mobility Manager, Visited Location Register, Visiting Serving Entity, or any other agent on a foreign network having the responsibility to manage mobility-related functionality for a mobile node on a foreign network.

The host or source computer is the computer sending the data communication on the Internet, and the mobile node is the mobile computer user moving within a network or into a separate new network. While the mobile node uses a single permanent IP home address, the mobile node can change its point of attachment to the Internet from one network to another. For the purposes of this application, a network includes a separate computer network or sub-network on a wireless communication system. The network referred to in this application must be capable of being connected to the Internet and associated with a particular router and routing address.

A Home Agent is a router with an interface on the mobile node's home network. The mobile node may be located on the home network, but the Home Agent will advertise accessibility to the mobile node whether the mobile node is located on the home network or not. The mobile node keeps the Home Agent informed of its current location by registering a care-of address as the mobile node moves from one network to another. Essentially, the care-of address represents the current foreign network where the mobile node is located.

If the mobile node is coupled to a foreign network, the Home Agent will "tunnel" communications to the mobile node. When "tunneling" a communication, the Home Agent advertises reachability to the mobile node thereby attracting receipt of IP data packets that are addressed for the mobile node. The Home Agent receives these packets and then tunnels them to the mobile node's current location on the foreign network via the care-of address.

A Foreign Agent is a router on a foreign network where the mobile node may located. The Foreign Agent assists the mobile node in informing its Home Agent of its current care-of address. The Foreign Agent also de-tunnels data packets for the mobile node after the data packets have been forwarded to the Foreign Agent by the Home Agent. Further, the Foreign Agent serves as a default router for out-going data packets generated by the mobile node while connected to the foreign network.

Foreign Agents and Home Agents periodically broadcast an agent advertisement to all nodes on the local network associated with that agent. An agent advertisement is a message from the agent on a network that may be issued under the Mobile IP protocol (RFC 2002) or any other type of communications protocol. This advertisement should include information that is required to uniquely identify a mobility agent (e.g. a Home Agent, a Foreign Agent, etc.) to a mobile node. Mobile nodes examine the agent advertisement and determine whether the mobile node is connected to its home network or a foreign network.

If the mobile node is located on its home network, no additional actions need to be taken because data packets will be routed to the node according to the standard addressing and routing scheme. If the mobile node is visiting a foreign network, however, the mobile node obtains a care-of address from the agent advertisement, and registers this care-of address with its Home Agent. The care-of address identifies the foreign network where the mobile node is located. The Home Agent uses this care-of address to tunnel data packets to the foreign network for subsequent transfer to the mobile node.

In a traditional wireless network, two types of channels transmit information on the wireless link between the mobile node and the edge of the wireless access network. Control messages are transmitted on control channels, and data is transmitted on data channels. Agent advertisements are not control messages, and as such, the agent advertisements are transmitted on the data channel of the wireless system. Because the agent advertisements are broadcast periodically (and frequently) on the data channel of the wireless network, agent advertisements have been found to occupy a significant amount of data capacity that could otherwise be used for data communications. It is therefore an objective of the present invention to optimize transmission of data on the data channels by reducing the amount of non-data communications on this channel—such as the frequent and periodic agent advertisements.

The present invention accomplishes this goal by reducing the broadcasts of agent advertisements to a single unicast transmitted in response to an agent solicitation initiated by the detection of a new mobile node entering the network or sub-network. An agent solicitation can include an agent solicitation as described by Mobile IP protocol (RFC 2002) or any other type of message sent by the mobile node to query the network for the presence of a mobility agent in that particular network. In this manner, the present invention minimizes the need for periodic and frequent broadcasts of agent advertisements on the data channels. In fact, agent advertisements are only transmitted on an "as needed" basis after movement of the mobile node into a new network is detected.

Movement of the mobile user is detected either by the mobile node or by some low-level (layer 2 and layer 3) protocol tasks or routines (e.g. cell-site transmitter) that are present in the Radio Access Network of the foreign network. The mobile node will detect movement in the case of a Mobile Assisted Handoff and the low-level protocol tasks or routines will detect mobile node movement in the case of Network Assisted Handoff. After the mobile user's movement into a new network is detected, the invention will initiate an agent solicitation from the mobile node or from the Radio Access Network to the mobility agent. The agent solicitation may be performed according to an event-driven or a polling method. The event-driven method will trigger the solicitation upon the detection of movement into a new network, and the polling method will initiate the solicitation after periodically querying the cell-site transmitter or mobile nodes to determine if any mobile node movement activity has occurred in a specified time period.

In response to the solicitation, the mobility agent will then transmit a single agent advertisement in a unicast transmission. The care-of address will be included in this agent advertisement. After extracting this care-of address from the agent advertisement, the care-of address will be registered with the Home Agent. The care-of address will identify the foreign network where the mobile node is located. With this location information, the Home Agent will be capable of "tunneling" data packets to the mobile node on the foreign network. Accordingly, the present invention achieves the registration of the care-of address with the Home Agent without the need for frequent broadcasts of periodic agent advertisements or the associated significant non-data traffic on the data channels of the wireless network.

BRIEF DESCRIPTION OF THE DRAWINGS

The objects and features of the invention will become more readily understood from the following detailed description and appended claims when read in conjunction with the accompanying drawings in which like numerals represent like elements and in which:

FIG. 1 is a schematic diagram of the prior art system using periodic broadcasts or multicasts of agent advertisements;

FIG. 2 is a flow chart representation of a prior art system using periodic broadcasts or multicasts of agent advertisements;

FIG. 3 is a schematic diagram of the invention showing the use of unicast agent advertisements;

FIG. 4 is a flow chart representation of the invention showing agent advertisement solicitation in response to motion detection; and, FIG. 5 is a flow chart representation of the invention showing agent advertisement solicitation in response to polling motion detection.

DETAILED DESCRIPTION OF THE PREFERRED EMBODIMENTS

Figure 5:
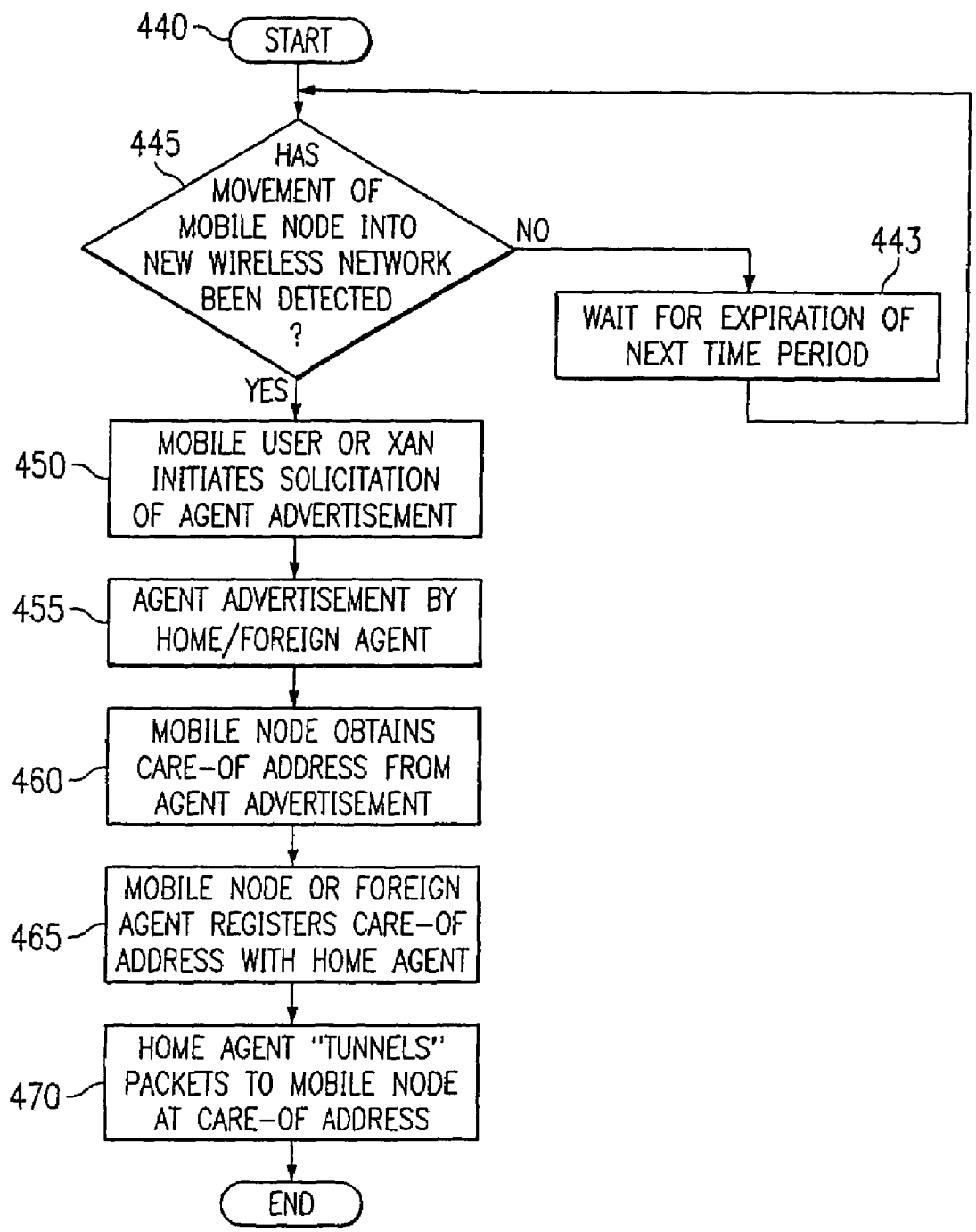

Mobile IP protocols support the routing of data communications to mobile nodes on the Internet. In a mobile IP system, each mobile node is identified by a permanent IP address. While the mobile node is coupled to its home network, the mobile node functions as any other fixed node on that network. When the mobile node moves from its home network to a foreign network, however, the home network sends data communications to the mobile node by "tunneling" the communications to the foreign network where the mobile user is located.

A care-of address identifies the foreign network where the mobile node is located. Mobile IP protocols require that the mobile node register the care-of address with the Home Agent on the home network after movement to a new network. After registration, all communications addressed to the mobile node are still routed according to normal IP protocols to the mobile node's home network. After the Home Agent receives this communication, however, the Home Agent sends, or "tunnels", the message to the mobile user at the foreign network via the care-of address. The Foreign Agent accepts the re-directed communication and delivers this communication to the mobile node located on its network.

As shown in FIG. 1, the prior art wireless system possesses a Home Agent 15 coupled to a network buss line 17 via connection 13. The network buss line 17 is coupled to a router 12 for routing of communications outside the wireless network or sub-network. The Home Agent 15, network buss line 17, and the router 12 form the home network 10. A transmitter xAN 55 is coupled to network buss line 17 and exchanges wireless communications with the mobile wireless users of the home network. The home network 10 is also coupled to the Internet 50 via connection 25.

In the system shown in FIG. 1, a Foreign Agent 24 is coupled to a foreign network buss line 27 via connection 23. The foreign network buss line 27 is also coupled to the foreign router 22 for routing communications to other networks. The Foreign Agent 24, foreign network buss line 27 and router 22 form the foreign network 20. The foreign network 20 is coupled to the Internet 50 via communication line 35. A transmitter xAN 57 is coupled to the foreign network buss line 27 and exchanges wireless communications with mobile wireless users of the foreign network.

The prior art system for registration of the care-of address with the Home Agent 15 initially requires a periodic broadcast of agent advertisements 30 by the Home Agent 15 and a periodic broadcast of agent advertisements 40 by the Foreign Agent 24. An agent advertisement is a message sent from an agent that includes identification information and routing information. An agent advertisement is transmitted by the Home Agent or the Foreign Agent to advertise the agent's presence on the local network or sub-network.

Mobile nodes use these advertisements to determine their current point of attachment to the Internet. For instance, the agent advertisement is used to determine whether the mobile node is located on a foreign network and to identify that particular foreign network. The agent advertisements possess a care-of address, or information that will allow the derivation of such care-of addresses, for subsequent registration with the Home Agent.

Looking at FIG. 2, the sequence of steps for registration of the care-of address in a prior art system starts at step 100 and proceeds to step 105 where the periodic agent advertisement is broadcast by the Home or Foreign Agent. The method progresses from step 105 to step 110 where the system determines if a new mobile node is coupled to the foreign network 20. If the system determines that there is no new mobile node coupled to the foreign network 20, the method progresses back to step 105 where a periodic agent advertisement is subsequently issued.

If the system determines that a new mobile node is coupled to the foreign network, the method progresses to step 115 where the mobile node obtains the care-of address from the agent advertisement issued by the Foreign Agent 24. After step 115, the method progresses to step 120 where the mobile node or the Foreign Agent 24 registers the care-of address with the Home Agent 15. The system then proceeds to step 125 where the Home Agent 15 "tunnels" communication packets to the mobile node via the foreign network at the care-of address. Because of the multiprocessing capabilities of the network, the movement of other mobile nodes may be detected in the movement detection step of 105 as it is performed concurrently with any one of steps 115, 120 and 125.

Every time the mobile node determines that it has moved to a new network, the mobile node will register the care-of address with the Home Agent after receiving the periodic broadcast of an agent advertisement. Two methods are predominantly used to determine whether the mobile node has moved to a new network. First, the mobile node will assume that it has moved to a new network if it receives the periodic agent advertisement from a new Foreign Agent after the expiration of a predetermined time period called a "lifetime." Once the "lifetime" expires, the mobile node or Foreign Agent will register the new care-of address from the new Foreign Agent with the Home Agent. Second, the mobile node will assume it has moved if the network prefix of a newly received agent advertisement does not match the network prefix of the last registered agent advertisement. If the prefixes are different, the mobile node will assume it has moved, and the mobile node or new Foreign Agent will register the new care-of address in the newly received agent advertisement with the Home Agent.

The Home Agent 15 also broadcasts agent advertisements 30 for use in detecting foreign mobile nodes in the home network and for detecting the return of mobile nodes back to the home network. The mobile node detects that it has returned to the home network when it receives an agent advertisement from its Home Agent 15. When the mobile node detects that it has returned to the home network, the mobile node should "de-register" with its Home Agent by indicating that there is no care-of address and/or tunneling of data packets to the mobile node through the Foreign Agent is no longer required.

From the above description, it has been shown that agent advertisements support: (1) detection of mobile node movement to a foreign network from the home network, (2) detection of mobile node movement to a new foreign network from a former foreign network, (3) determination of the care-of address for registration with Home Agent, and (4) detection of mobile node return to the home network. As readily appreciated from the above discussion, the agent advertisement is instrumental to the detection of mobile node movement and the proper "tunneling" of data packets via the care-of address. Not only are agent advertisements necessary for the mobile IP system, but the agent advertisements must be broadcast frequently over predetermined short time periods for the mobile IP system to effectively (and timely) detect mobile node movement.

Agent advertisements, however, are not control signals broadcast on the control channels of a wireless network. As such, agent advertisements are broadcast on data channels of the wireless network. Because wireless networks possess limited data bandwidths, the use of a data channel to broadcast frequent and periodic non-data signals greatly reduces the efficiency of the wireless system.

As shown in FIG. 3, the present invention has a home network 210 comprised of a Home Agent 215 coupled to a home network buss 217 via communication link 213. The home network also includes router 212. The home network is coupled to transmitter xAN 255 via the home network buss 217. The home network 210 is also coupled to the Internet 250 via communication 225.

A foreign network 220 is shown in FIG. 3 as comprising Foreign Agent 224 coupled to foreign buss line 227 via communication line 223. The foreign network also includes router 222. The foreign network 220 includes a foreign transmitter xAN 257 coupled to the foreign network via foreign communication buss 227.

The present invention eliminates the need for frequent periodic agent advertisements on the data channel by soliciting an agent advertisement only when the system detects the movement of the mobile node 275 into a new foreign network or sub-network. For the purposes of this application, the invention can cover the movement of a mobile node into a new network and sub-network and the power-up of a mobile node within a foreign network. The mobile node 275 is initially coupled to the home network 210 via transmitter xAN 255. As the mobile node 275 moves toward the foreign network, the movement of the mobile node 275 is detected by routines or tasks performed at the lower protocol layers (layer 2 and layer 3). The movement of the mobile node 275 may be detected by the mobile node 275, the cell-site transmitter xAN 255 communicating with the mobile node, the Foreign Agent or other network component.

The movement of the mobile node 275 is detected using layer 2 and layer 3 protocols from the standard protocol stack. These low-level protocols, such as the Network or Data Link protocol layers, do not include application level programming. As such, the movement detection is automated in the lower level protocols layers to avoid requiring user interactions in order to initiate the agent solicitation. The invention could also be performed at other protocol layers, but it is preferable that the mobile node user not be required to interface with the movement detection protocols so as to maintain the transparent operation of the system level tasks.

After detection of mobile node 275 movement into the foreign network, the agent solicitation may be initiated either by the transmitter xAN 257 or the mobile node operating in cooperation with the transmitter xAN 257. After initiation of the agent solicitation, the transmitter xAN 257 will transmit an agent solicitation message 240 to the Foreign Agent 224. In response to the agent solicitation 240, the Foreign Agent 224 transmits the agent advertisement in a unicast transmission to transmitter xAN 257. The agent advertisement 241 is transmitted to the mobile node 275 via wireless communication 280. The agent advertisement may contain the care-of address or information from which the care-of address can be derived. In this manner, the agent advertisement is unicast to the mobile node one time on an "as needed" basis without frequently burdening a data channel with periodic broadcasts of non-data communications.

FIG. 4 shows an event-driven method for care-of address registration based upon detection of the movement of a mobile node into a new wireless network. The method starts at step 300 and proceeds to step 305 where the system determines whether there is movement of a mobile node into a new wireless network or sub-network. The mobile node or the cell-site transmitter communicating with the mobile node detects the mobile node movement. The movement may also be detected by the Foreign Agent or another component in the foreign network. The movement of the mobile node is detected using routines or tasks performed on layer 2 and layer 3 protocols from the protocol stack. If no movement is detected, the method proceeds back to the beginning of the process above step 305. The inquiry at step 305 will be repeated until movement of a mobile node into a new network is detected.

Upon detection of movement of a mobile node into a new network, the method will proceed to step 310 where the mobile node or the cell-site transmitter will initiate an agent solicitation message. The Home or Foreign Agent will receive this agent solicitation message. Thereafter, the method will proceed to step 315 where the Home or Foreign Agent will issue an agent advertisement in a unicast transmission. The agent advertisement may contain the care-of address or information from which the care-of address can be derived. The method will then proceed to step 320 where the mobile node will extract the care-of address from the received agent advertisement.

Next, the method executes step 325 where the mobile node or the Foreign Agent registers the care-of address with the Home Agent. The Home Agent will begin to forward, or "tunnel", data packets to the mobile node at the care-of address in the following step 330. Because of the multiprocessing capabilities of the network, the movement of other mobile nodes may be detected in the movement detection step of 305 as it is performed concurrently with any one of steps 310 to 330. The Home Agent will continue to "tunnel" data packets to the care-of address until the mobile node returns to the home network, a new care-of address is received by the Home Agent, the mobile node powers down in the foreign network or the predetermined "lifetime" period expires without re-registration of a care-of address.

FIG. 5 shows a polling method for care-of address registration based upon detection of the movement of a mobile node into a new wireless network at specified time periods. The method starts at step 440 and proceeds to step 445 where the system determines whether there is movement of a mobile node into a new wireless network or sub-network. The mobile node or the cell-site transmitter communicating with the mobile node detects the mobile node movement. The movement may also be detected by the Foreign Agent or another component in the foreign network. The movement of the mobile node is detected using routines or tasks performed on layer 2 and layer 3 protocols from the protocol stack. If no movement is detected, the method proceeds to step 443 where the method will wait until a predetermined time period expires. After expiration of the time period, the method will proceed back to the beginning of the process above step 445. The polling combination of inquiry steps at step 445 and 443 will be repeated until movement of a mobile node into a new network is detected.

Upon detection of movement of a mobile node into a new network, the method will proceed to step 450 where the mobile node or the transmitter will initiate an agent solicitation message. The Home or Foreign Agent will receive this agent solicitation message. Thereafter, the method will proceed to step 455 where the Home or Foreign Agent will issue an agent advertisement in a unicast transmission. The agent advertisement may contain the care-of address or information from which the care-of address can be derived. The method will then proceed to step 460 where the mobile node will extract the care-of address from the received agent advertisement.

Next, the method executes step 465 where the mobile node or the Foreign Agent registers the care-of address with the Home Agent. The Home Agent will begin to forward, or "tunnel", data packets to the mobile node at the care-of address in the following step 470. Because of the multiprocessing capabilities of the network, the movement of other mobile nodes may be detected in the movement detection step of 445 as it is performed concurrently with any one of steps 450 to 470. As with the prior system, the Home Agent will continue to "tunnel" data packets to the care-of address until the mobile node returns to the home network, a new care-of address is received by the Home Agent, the mobile node powers down in the foreign network or the predetermined "lifetime" period expires without re-registration of the care-of address.

While the invention has been particularly shown and described with respect to preferred embodiments, it will be readily understood that minor changes in the details of the invention may be made without departing from the spirit of the invention. Having described the invention, we claim:

The invention claimed is:

1. A method of communicating to a mobile node on a communications system having a home network with a home agent and at least one foreign wireless network with a foreign agent, comprising the steps of:

receiving an agent solicitation at the foreign agent where said solicitation is initiated by the detection of movement of the mobile node into said foreign network using protocols operating on the Network Layer (layer 2) and Link Layer (layer 3) level, said solicitation message transmitted either by A TRANSMITTER or the mobile node operating in cooperation with the transmitter;

transmitting an agent advertisement from the foreign agent in response to the agent solicitation to the mobile node as a unicast message addressed to the mobile node; and, transmitting a care-of address to the home agent based upon information in the agent advertisement to support redirection of data packets for the mobile node to the foreign network where the mobile node is located.

2. The method of claim 1 further comprising the step of detecting mobile node movement with the mobile node.

3. The method of claim 1 further comprising the step of detecting mobile node movement with a cell-site transmitter communicating with the mobile node.

4. The method of claim 1 further comprising the step of detecting mobile node movement within the foreign network.

5. The method of claim 1 further comprising the step of detecting mobile node movement upon power up of the mobile node in the foreign network.

6. The method of claim 1 further comprising the step of initiating the agent solicitation with the mobile node.

7. The method of claim 1 further comprising the step of initiating the agent solicitation with a cell-site transmitter communicating with the mobile node.

8. The method of claim 1 further comprising the step of de-registering the care-of address upon power down of the mobile node in the foreign network.

9. The method of claim 1 further comprising the step of de-registering the care-of address with the home agent after the mobile node returns to the home network.

10. The method of claim 9 further comprising the step of detecting mobile node movement with the mobile node.

11. The method of claim 9 further comprising the step of detecting mobile node movement with a cell-site transmitter communicating with the mobile node.

12. The method of claim 9 further comprising the step of detecting mobile node movement within the foreign network.

13. The method of claim 9 further comprising the step of detecting mobile node movement upon power up of the mobile node in the foreign network.

14. The method of claim 9 further comprising the step of initiating the agent solicitation with the mobile node.

15. The method of claim 9 further comprising the step of initiating the agent solicitation with a cell-site transmitter communicating with the mobile node.

16. The method of claim 1 further comprising the step of detecting mobile node movement with a routine performed on a low-level protocol layer.

17. The method of claim 16 further comprising the step of detecting mobile node movement with the mobile node.

18. The method of claim 16 further comprising the step of detecting mobile node movement with a cell-site transmitter communicating with the mobile node.

19. The method of claim 16 further comprising the step of detecting mobile node movement within the foreign network.

20. The method of claim 16 further comprising the step of detecting mobile node movement upon power up of the mobile node in the foreign network.

21. The method of claim 16 further comprising the step of initiating the agent solicitation with the mobile node.

22. The method of claim 16 further comprising the step of initiating the agent solicitation with a cell-site transmitter communicating with the mobile node.

23. A method of determining the care-of address for a mobile node in a wireless foreign network, comprising the steps of:

detecting movement of the mobile node into the foreign network using protocols operating on the Network Layer (layer 2) or Link Layer (layer 3) level;

transmitting an agent solicitation to a foreign agent in the foreign network in response to the detection of movement of the mobile node onto the foreign network coupled to a transmitter to support communication with said mobile node, said agent solicitation transmitted by the transmitter or by the mobile node operating in cooperation with said transmitter;

transmitting an agent advertisement in response to receiving the agent solicitation as a unicast message addressed to the mobile node;

deriving the care-of address for the mobile node from at least a portion of the information in the agent advertisement.

24. The method of claim 23 further comprising the step of detecting mobile node movement with a routine performed on a low-level protocol layer.

25. The method of claim 23 further comprising the step of detecting mobile node movement with the mobile node.

26. The method of claim 23 further comprising the step of detecting mobile node movement with a cell-site transmitter communicating with the mobile node.

27. The method of claim 23 further comprising the step of detecting mobile node movement within the foreign network.

28. The method of claim 23 further comprising the step of detecting mobile node movement upon power up of the mobile node in the foreign network.

29. The method of claim 23 further comprising the step of initiating the agent solicitation with the mobile node.

30. The method of claim 23 further comprising the step of initiating the agent solicitation with a cell-site transmitter communicating with the mobile node.

31. A system for communicating to a mobile node in a wireless communications network comprising:

a home network having a home agent coupled to a communications buss line for the home network and a router capable of directing communications to and from the home network;

a foreign network having a foreign agent coupled to a communications buss for the foreign network, a router capable of directing communications to and from the foreign network, and a transmitter capable of performing wireless communications with at least one mobile node located in the transmission range of the transmitter for the foreign network and transmitting an agent solicitation message initiated by the detection of mobile node movement into transmission range for the foreign network by the transmitter or the mobile node in cooperation with the transmitter;

wherein the foreign network transmits an agent advertisement as a unicast message directed to the mobile node in response to said agent solicitation initiated by the detection of mobile node movement into transmission range for the foreign network using protocols operating on the Network Layer (layer 2) or Link Layer (layer 3) level.

32. The system of claim 31 further comprising the detection of the mobile node movement with the mobile node.

33. The system of claim 31 further comprising the detection of the mobile node movement with a cell-site transmitter communicating with the mobile node.

34. The system of claim 31 further comprising the detection of the mobile node movement within the foreign network.

35. The system of claim 31 further comprising the detection of mobile node movement upon power up of the mobile node in the foreign network.

36. The system of claim 31 further comprising initiation of the agent solicitation with the mobile node.

37. The system of claim 31 further comprising initiation of the agent advertisement with a cell-site transmitter communicating with the mobile node.

38. The system of claim 31 further comprising the agent advertisement possessing a care-of address that identifies the location of the foreign network.

39. The system of claim 38 further comprising the mobile node registration of the care-of address with the home agent to support redirection of data packets to the mobile node located on the foreign network.

40. The system of claim 39 further comprising the mobile node de-registration of the care-of address with the home agent after the mobile node returns to the home network.

41. The system of claim 39 further comprising the mobile node de-registration of the care-of address with the home agent after the mobile node powers down in the foreign network.

42. The system of claim 39 further comprising the detection of the mobile node movement with the mobile node.

43. The system of claim 39 further comprising the detection of the mobile node movement with a cell-site transmitter communicating with the mobile node.

44. The system of claim 39 further comprising initiation of the agent solicitation with the mobile node.

45. The system of claim 39 further comprising initiation of the agent solicitation with a cell-site transmitter communicating with the mobile node.

46. The system of claim 39 further comprising the detection of the mobile node movement within the foreign network.

47. The system of claim 39 further comprising the detection of mobile node movement upon power up of the mobile node in the foreign network.

48. The system of claim 31 further comprising detection of mobile node movement with a routine performed on a low-level protocol layer.

49. The system of claim 48 further comprising the detection of the mobile node movement with the mobile node.

50. The system of claim 48 further comprising the detection of the mobile node movement with a cell-site transmitter communicating with the mobile node.

51. The system of claim 48 further comprising the detection of the mobile node movement within the foreign network.

52. The system of claim 48 further comprising the detection of mobile node movement upon power up of the mobile node in the foreign network.

53. The system of claim 48 further comprising initiation of the agent solicitation with the mobile node.

54. The system of claim 48 further comprising initiation of the agent advertisement with a cell-site transmitter communicating with the mobile node.

* * * * *